US007471798B2

(12) United States Patent
Warren

(10) Patent No.: US 7,471,798 B2
(45) Date of Patent: Dec. 30, 2008

(54) MICROPHONE ARRAY HAVING A SECOND ORDER DIRECTIONAL PATTERN

(75) Inventor: Daniel M. Warren, Geneva, IL (US)

(73) Assignee: Knowles Electronics, LLC, Itasca, IL (US)

( * ) Notice: Subject to any disclaimer, the term of this patent is extended or adjusted under 35 U.S.C. 154(b) by 855 days.

(21) Appl. No.: 10/424,552

(22) Filed: Apr. 28, 2003

(65) Prior Publication Data

US 2004/0022397 A1 Feb. 5, 2004

(51) Int. Cl.
*H04R 3/00* (2006.01)
*H04R 1/02* (2006.01)
*H04R 25/00* (2006.01)
*G01S 3/80* (2006.01)

(52) U.S. Cl. .......................... 381/92; 381/91; 381/122; 381/312; 381/313; 381/111; 367/119; 367/131; 367/121

(58) Field of Classification Search .................. 381/92, 381/91, 312, 122, 111, 313, 356; 367/129, 367/121, 119
See application file for complete search history.

(56) References Cited

U.S. PATENT DOCUMENTS 5,058,170 A * 10/1991 Kanamori et al. ............. 381/92
5,224,170 A * 6/1993 Waite, Jr. ..................... 381/92
5,463,694 A * 10/1995 Bradley et al. ................ 381/92
5,506,908 A * 4/1996 Baumhauer et al. ........... 381/92
6,654,468 B1 * 11/2003 Thompson .................... 381/92
6,741,713 B1 * 5/2004 Boone et al. ................ 381/313
6,788,796 B1 * 9/2004 Miles et al. ................. 381/357
7,113,604 B2 * 9/2006 Thompson .................... 381/92

FOREIGN PATENT DOCUMENTS

EP 982971 A2 * 3/2000
WO WO-02/28140 A2 4/2002

OTHER PUBLICATIONS

Applicant's admitted prior art, Figure 18 and p. 21, lines 6-8.*
International Search Report for Application No. PCT/US2004/013012 dated Oct. 1, 2004.

* cited by examiner

*Primary Examiner*—Vivian Chin
*Assistant Examiner*—Devona E. Faulk
(74) *Attorney, Agent, or Firm*—Marshall, Gerstein & Borun LLP

(57) ABSTRACT

A directional microphone system is disclosed, which comprises circuitry for low pass filtering a first order signal, and circuitry for high pass filtering a second order signal. The system further comprises circuitry for summing the low pass filtered first order signal and the high pass filtered second order signal. A method of determining whether a plurality of microphones have sufficiently matched frequency response characteristics to be used in a multi-order directional microphone array is also disclosed. For a microphone array having at least three microphones, wherein one of the microphones is disposed between the other of the microphones, a method of determining the arrangement of the microphones in the array is also disclosed.

8 Claims, 11 Drawing Sheets

5A 5B 5C 4A 4B 4C

MICROPHONE ARRAY HAVING A SECOND ORDER DIRECTIONAL PATTERN

CROSS-REFERENCE TO RELATED APPLICATIONS

This application claims priority from, and expressly incorporates by reference, U.S. Nonprovisional Patent Application No. 09/966,873, filed Sep. 28, 2001, which claims priority from U.S. Provisional Patent Application No. 60/236,768, filed Sep. 29, 2000 and U.S. Provisional Patent Application No. 60/322,211, filed Sep. 11, 2001.

FEDERALLY SPONSORED RESEARCH OR DEVELOPMENT

Not Applicable.

TECHNICAL FIELD

The present invention relates to microphone arrays having second order directional patterns.

BACKGROUND OF THE INVENTION

Microphone arrays having directional patterns can be made using two or more spaced, omnidirectional microphones. Systems using two microphones to form first order directional patterns are in widespread use in hearing aids today. The directional performance can theoretically be improved by using three or more microphones to form second order, or other higher order, directional patterns. These second and higher order directional systems, however, are made more difficult by the practical issue that the microphone sensitivities must be matched very closely to obtain the improved directional performance. Methods are needed to match the microphones sensitivity as well as is possible, and also to obtain improved directionally in the presence of the remaining sensitivity errors.

Attempts have been made to measure phase differences of microphones at frequencies just below the resonant frequency of the microphones, and to only accept a group of microphones for an array having such phase differences within a predetermined tolerance. Such attempts have been too restrictive in finding microphones which fall within this criteria, while at the same time such attempts have still not determined adequately matched microphones.

With the assumption that the microphones are not perfectly matched, there is also a need to determine in what order to place the microphones in the array for optimum directivity.

The present invention is provided to solve these and other problems.

SUMMARY OF THE INVENTION

It is an object of one aspect of the invention to provide a directional microphone system.

In accordance with this aspect of the invention, the system comprises means for providing a first order signal representing a first order pattern and means for low pass filtering the first order signal. The system further comprises means for providing a second order signal representing a second order pattern and means for high pass filtering the second order signal. The system still further comprises means for summing the low pass filtered first order signal and the high pass filtered second order signal.

It is an object of another aspect of the invention to provide a method of determining whether a plurality of microphones have sufficiently matched frequency response characteristics to be used in a multi-order directional microphone array.

In accordance with this aspect of the invention, the quality of the microphone matching in the region of the resonant peak is determined by determining the frequency and Q of the resonance of each of the microphones, and determining whether the differences between the Q of each of the microphones and the resonant frequencies of each of the microphones falls within an acceptable tolerance.

For example. typically, a microphone has a frequency response over a range of frequencies having a generally linear portion, rising to a peak at a resonant frequency $f_r$, followed by a declining portion. The difference in the magnitude of the linear portion and the magnitude at the resonant frequency f is often referred to as Δp. The Q of the resonance is related to Δp by Δp=20 log Q, so matching Δp is equivalent to matching Q.

Accordingly, the Δp of each of the microphones and the resonant frequency of each of the microphones are determined. It is then determined whether the differences between the Δp's of each of the microphones and the resonant frequency of each of the microphones falls within an acceptable tolerance.

For a microphone array having at least three microphones, wherein one of the microphones is disposed between the other of the microphones, it is a further object of the invention to provide a method of determining the arrangement of the microphones in the array for optimum directivity.

In accordance with this aspect of the invention, the method includes placing the microphones in an order which minimizes the largest error in the directional response of the array. The microphones should be placed in order such that the central microphone's response is in between the response of the outermost microphones over the major part of the high frequency band. In certain circumstances, this ordering can be determined by sorting the microphones in order of their response at a single frequency.

For example, the response of each of the microphones at a frequency above the resonant frequency of each of the microphones is measured, and the microphone having the middle response is selected as the microphone in the array between the other two of the microphones.

DETAILED DESCRIPTION OF THE INVENTION

Figure 1:
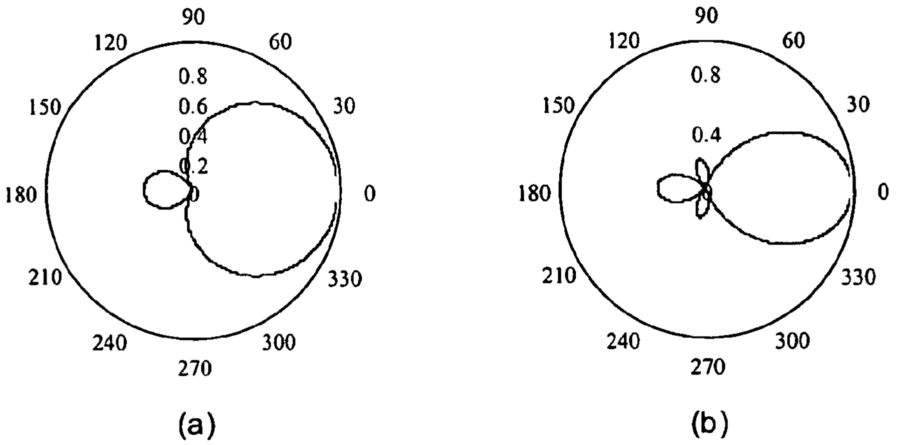
FIG. 1 illustrates a hypercardioid pattern and a second order pattern with the highest directivity.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

For ease of understanding, the following is a glossary of certain terms used herein:

Pressure microphone—The microphone type that is conventionally used in hearing aids. This microphone senses the acoustic pressure at a single point. The pressure microphone has equal sensitivity to sounds from all directions.

First order difference pattern—A pattern that is formed as the difference in pressure between two points in space. The two-port microphones often used in hearing aids are of this type.

Second order difference pattern—A pattern that is formed as the difference between two first order patterns.

Dipole—A first order difference pattern that has equal response magnitude in the front and back directions, with nulls in the response to the sides. Mathematically, the pattern has the shape $R(\theta)=B\cos\theta$.

Cardioid—A first order difference pattern that has maximum response in the forward direction and a single null to the rear. Its pattern function is $R(\theta)=A(1+\cos\theta)$.

Hypercardioid—The first order difference pattern that has maximum directivity index. Its pattern function is $R(\theta)=A(1+3\cos\theta)$.

Bidirectional—General name for any pattern that has equal maximum response in both the front and rear directions. The dipole is the first order bidirectional pattern. The quadrupole is a second order bidirectional pattern.

Quadrupole—A second order bidirectional pattern whose pattern function is $R(\theta)=A\cos^2\theta$.

The addition of directional microphone response patterns in a hearing aid provides a significant benefit to the user in the ability to hear in noisy situations. At the present time, hearing aid manufacturers are providing the directional patterns either by combining the outputs of two conventional microphones, or by augmenting the pattern of a single conventional microphone with that of a first order directional microphone. In either case, a range of first order directional patterns is available (cardioid, hypercardioid, bidirectional, etc.). These patterns can provide a maximum increase in Signal-to-Noise Ratio (SNR) of 6 dB in a non-directional noise field.

A further improvement in SNR can theoretically be achieved by adding another level of complexity to the directional system. Combining the output of three conventional microphones, or of a single pressure microphone and one or more first order gradient microphones, can provide a theoretical improvement in SNR to 9.5 dB. The following provides a theoretical comparative evaluation of the performance available from systems having two and three pressure microphones. Systems including a pressure microphone in combination with one or more first order directional microphones have similar performance, and will be discussed as well. FIG. 1*a* illustrates a hypercardioid pattern, which is the first order pattern with the highest directivity. FIG. 1*b* illustrates a second order pattern with the highest directivity and which has a narrower response in the forward direction.

Patterns Available From two Microphones

Figure 2:
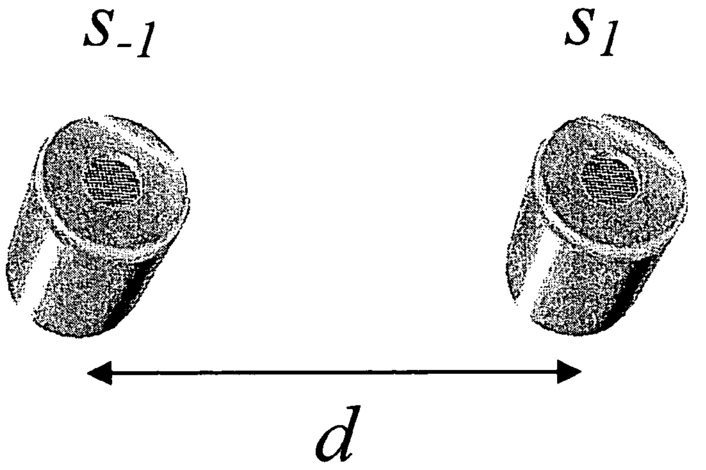
FIG. 2 illustrates two pressure microphones.

Given two microphones separated by a distance d as shown, in FIG. 2 the response $R(\theta)$ is given by:

$$R(\theta) = s_{-1}{}^{-j\frac{kd}{2}\cos\theta} + s_1 e^{j\frac{kd}{2}\cos\theta}$$

where:

$s_{-1}$ and $s_1$ are the sensitivities of the two microphones;

$k=2\pi/\lambda=2\pi f/c$ is the acoustic wavenumber;

$\lambda$ is the wavelength of the sound;

f is the acoustic frequency;

c is the speed of sound in air; and $\theta$ is the angle between the line joining the microphones and the propagation direction of the incoming wavefront.

In a hearing aid, the microphone separation is always much less than the wavelength, so that kd<<1. To approximate the response for a first-order directional pattern, it is necessary to keep terms only to first order in kd. Thus, one may expand the equation for the response as:

$$\begin{aligned} R(\theta) &\approx s_{-1}\left(1 - j\frac{kd}{2}\cos\theta\right) + s_1\left(1 + j\frac{kd}{2}\cos\theta\right) \\ &\approx (s_{-1} + s_1) + j\frac{kd}{2}(s_1 - s_{-1})\cos\theta \\ &\approx A + B\cos\theta. \end{aligned}$$

Figure 4:
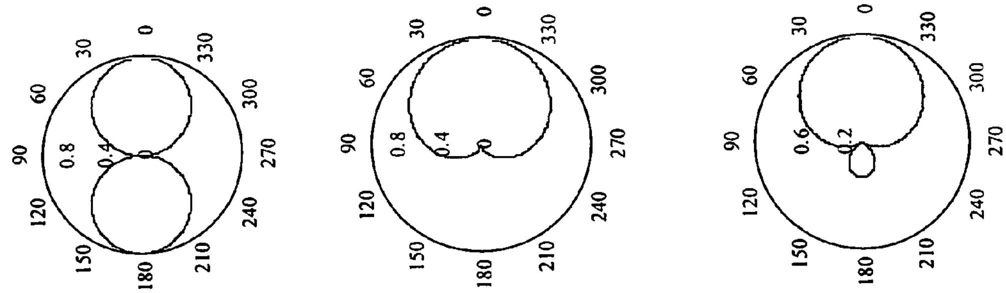
FIG. 4 illustrates three first order directivity patterns.

The set patterns that is available with real number values of A and B is the set of limacon patterns. Examples of this family are shown in FIG. 4. Note that the "forward" direction is to the right in the figure.

FIG. 2 illustrates two microphones, which can provide the first order difference directivity patterns of the dipole (FIG. 4*a*), the cardioid (FIG. 4*b*), and the hypercardioid (FIG. 4*c*).

The dipole pattern is formed when A=0. The dipole has nulls in its response in directions to the sides. The second pattern is a cardioid pattern, formed when A=B. The cardioid has a single null in the back direction. The third pattern is a hypercardioid, formed when B=3A. The hypercardioid is the first order pattern with the highest directivity index.

Patterns Available From Three Microphones

Figure 3:
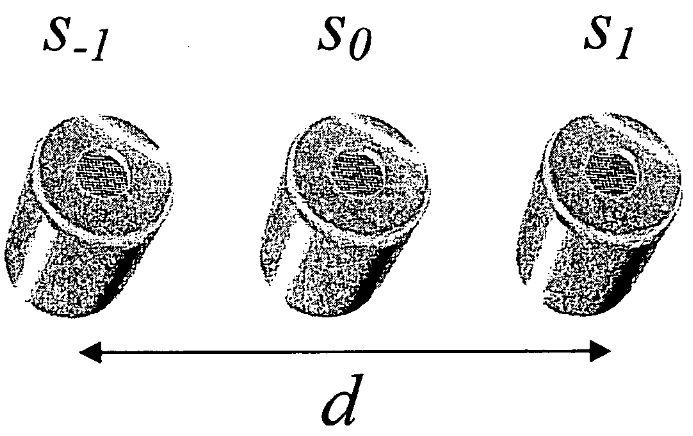
FIG. 3 illustrates three pressure microphones.

Given three microphones separated by a distance d as shown in FIG. 3, the response R(θ) is given by:

$$R(\theta) = s_{-1}e^{-j\frac{kd}{2}\cos\theta} + s_0 + s_1 e^{j\frac{kd}{2}\cos\theta}$$

where:

$s_{-1}$, $s_0$, and $s_1$ are the sensitivities of the microphones;

k=k=2π/λ=2πf/c is the acoustic wavenumber;

λ is the wavelength of the sound;

f is the acoustic frequency;

c is the speed of sound in air; and

θ is the angle between the line joining the microphones and the propagation direction of the incoming wavefront.

As discussed above, in a hearing aid, the microphone separation is always much less than the wavelength, so that kd<<1. To approximate the response for a second-order directional pattern, it is necessary to keep terms to second order in kd. Thus one may expand the equation for the response as:

$$\begin{aligned} R(\theta) &\approx s_{-1}\left(1 - j\frac{kd}{2}\cos\theta - \frac{(kd)^2}{8}\cos^2\theta\right) + s_0 + \\ &\quad s_1\left(1 + j\frac{kd}{2}\cos\theta - \frac{(kd)^2}{8}\cos^2\theta\right) \\ &\approx (s_0 + s_{-1} + s_1) + j\frac{kd}{2}(s_{-1} + s_1)\cos\theta - \frac{(kd)^2}{8}(s_{-1} + s_1)\cos^2\theta \\ &\approx A + B\cos\theta + C\cos^2\theta. \end{aligned}$$

Figure 5:
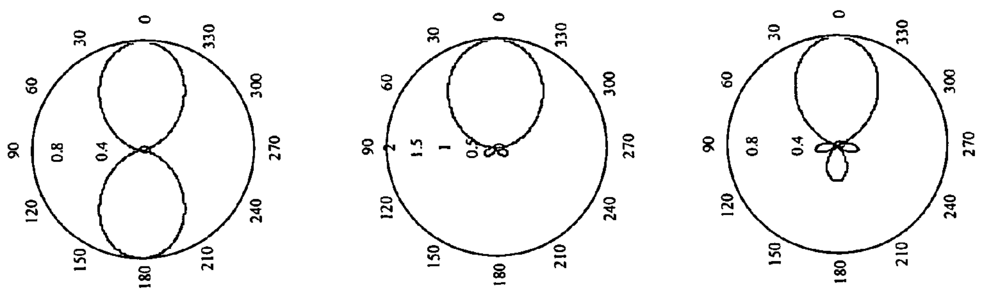
FIG. 5 illustrates three second order directivity patterns.

Examples of this family are shown in FIG. 5, which illustrates the quadrupole pattern (FIG. 5*a*), and two others. Note that the "forward" direction is to the right in the figure.

The quadrupole pattern is formed when A=B=0. The quadrupole has nulls in its response in directions to the sides. The second pattern is formed when A=0 and B=C. This pattern has arranged to have a null to the rear direction. The third pattern is formed when B=2A and C=5A. This is the second order pattern with the highest directivity index.

Directivity Index

Examining the directional patterns above for two- and three-microphone systems, it is clear that some patterns have a broader response pattern in the forward direction, and others have more suppression in directions toward the rear. One way to compare the directivity of different patterns is a measure called the directivity index (DI). The DI is the ratio, in dB, of the signal that would be received by an omnidirectional to the signal received by the directional pattern in a sound field where sound arrives equally from all directions. Mathematically, the directivity index DI is given by $$DI = 10\log\left\{\frac{2[R(0)]^2}{\int_0^\pi [R(\theta)]^2 \sin\theta d\,\theta}\right\}.$$

Note that this is an idealized measure that is easy to calculate for idealized microphone patterns. In realistic cases where the microphone is in a hearing aid and mounted on the head of a user, the pattern is highly unsymmetrical and the DI is difficult to calculate. Furthermore, the idealized uniform sound field is seldom A realistic approximation to the actual ambient noise field present in real environments. However the DI is still a useful measure for comparing systems.

DI for Two Microphones

Substituting the expression above for the first order beam pattern, $$\begin{aligned} DI &= 10\log\left[\frac{2(A+B)^2}{\int_0^\pi (A + B\cos\theta)^2 \sin\theta d\theta}\right] \\ &= 10\log\left[\frac{(A+B)^2}{A^2 + \frac{1}{3}B^2}\right]. \end{aligned}$$

The table below lists the DI of several patterns in the limacon family. The pattern called the hypercardioid is optimum in the sense that it has the highest directivity of any first order pattern.

| Pattern | A | B | DI |
|---|---|---|---|
| Omnidirectional | 1.0 | 0.0 | 0.0 |
| Dipole | 0.0 | 1.0 | 4.8 |
| Cardioid | 0.5 | 0.5 | 4.8 |
| Hypercardioid | .25 | .75 | 6.0 |

A Conceptual Implementation for Two Microphones

To get to a practical implementation, one needs to calculate the summing coefficients of the microphones from the values of A and B for the desired pattern. From the equations above, the definition of A and B are:

$$A = s_{-1} + s_1$$

$$B = j\frac{kd}{2}(s_1 - s_{-1}).$$

Solving for the microphone summing coefficients:

$$\begin{aligned} s_1 &= \frac{1}{2}A - \frac{j}{kd}B \\ s_{-1} &= \frac{1}{2}A + \frac{j}{kd}B. \end{aligned}$$

As an example, one can consider a block diagram which can form a dipole pattern. For the dipole:

A=0,B=1

$$s_1 = -\frac{j}{kd},\quad s_{-1} = \frac{j}{kd}.$$

Figure 6:
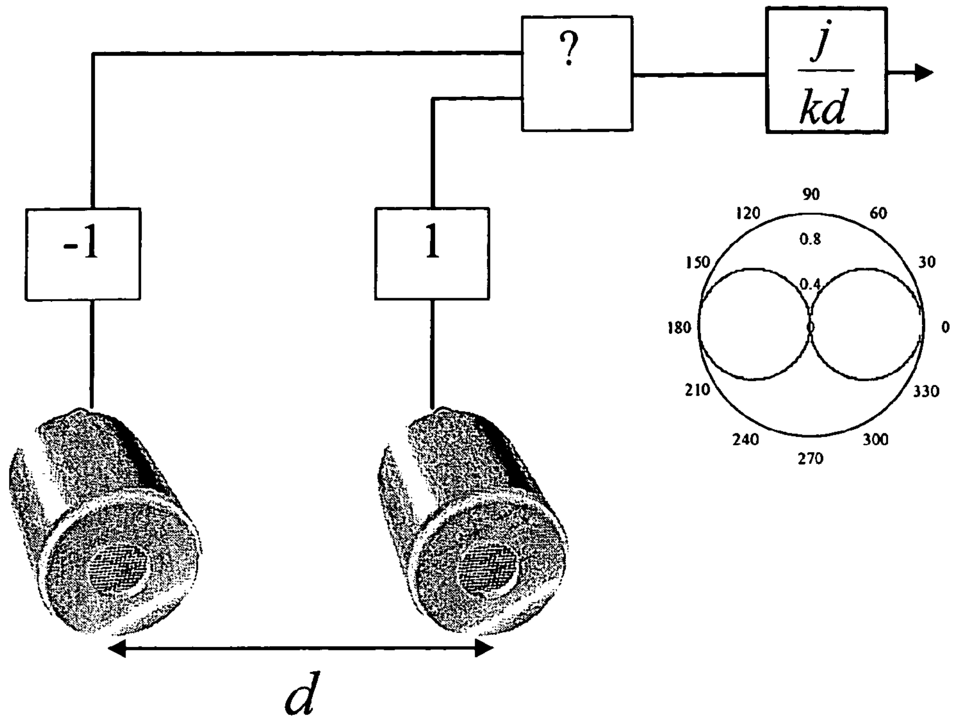
FIG. 6 is a block diagram of circuitry to form a dipole pattern.

A block diagram that implements the directional processing is shown in FIG. 6. The integration filter at the output is necessary to provide a flat frequency response to the signal from the dipole. The implementation performs the signal addition before the filtering to accomplish the task with a single filter.

A more complete example is to form the optimum first order pattern, the hypercardioid. For this pattern:

$$A=\frac{1}{4},\quad B=\frac{3}{4}$$

$$s_1=\frac{1}{8}-j\frac{3}{4kd},\quad s_{-1}=\frac{1}{8}+j\frac{3}{4kd}.$$

Figure 7:
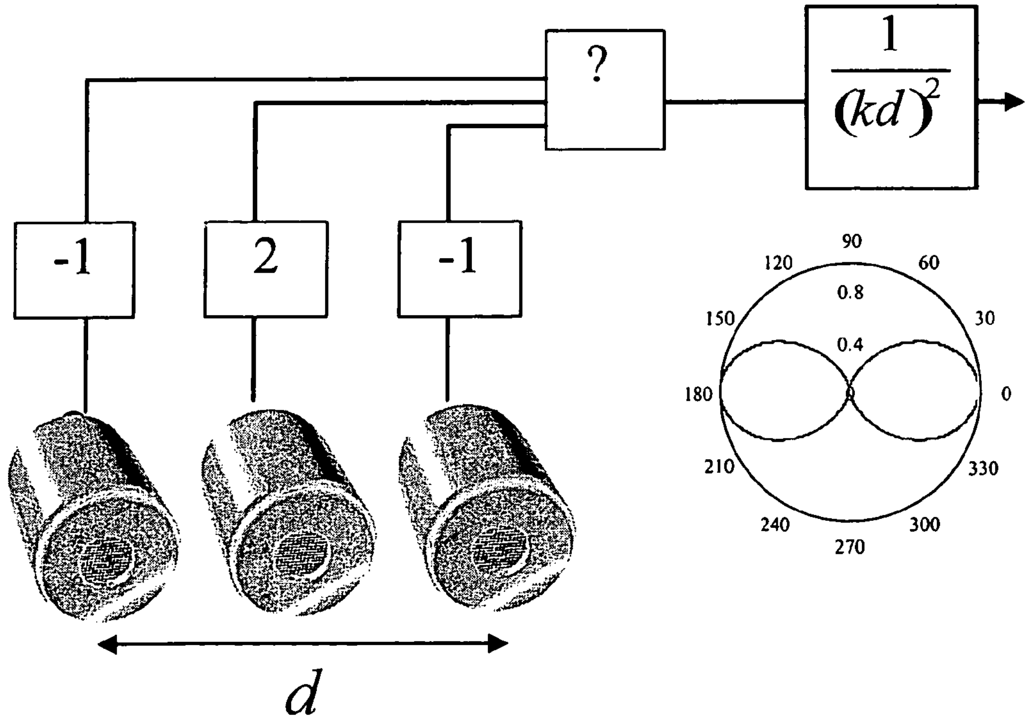
FIG. 7 is a block diagram of circuitry to form a hypercardioid pattern.

A block diagram that implements the directional processing is illustrated in FIG. 7, which is a block diagram showing circuitry needed to form a hypercardioid pattern.

DI for Three Microphones

Substituting the expression above for the second order beam pattern:

$$DI=10\ \log\left[\frac{2(A+B+C)^2}{\int_0^\pi (A+B\cos\theta+C\cos^2\theta)^2\sin\theta\, d\theta}\right]$$

$$=10\ \log\left[\frac{(A+B+C)^2}{A^2+\frac{1}{3}B^2+\frac{1}{5}C^2+\frac{2}{3}AC}\right].$$

The table below lists the DI of several second order patterns. The pattern listed as Optimum $2^{nd}$ Order is optimum in the sense that it has the highest directivity of any second order pattern.

| Pattern | A | B | C | DI |
|---|---|---|---|---|
| Omnidirectional | 1.0 | 0.0 | 0.0 | 0.0 |
| Quadrupole | 0.0 | 0.0 | 1.0 | 7.0 |
| w/rear null | 0.0 | 0.5 | 0.5 | 8.8 |
| Optimum $2^{nd}$ Order | −1/6 | 1/3 | 5/6 | 9.5 |

A Conceptual Implementation for Three Microphones

To get to a practical implementation, one needs to calculate the summing coefficients of the microphones from the values of A, B and C for the desired pattern. From the equations above, the definitions of A, B and C are:

$$A=s_0+s_{-1}+s_1$$

$$B=j\frac{kd}{2}(s_1-s_{-1})$$

$$C=-\frac{(kd)^2}{8}(s_1+s_{-1}).$$

Solving for the microphone summing coefficients:

$$s_0=A+\frac{8}{(kd)^2}C$$

$$s_1=-\frac{4}{(kd)^2}C-\frac{j}{kd}B$$

$$s_{-1}=-\frac{4}{(kd)^2}C+\frac{j}{kd}B.$$

Figure 8:
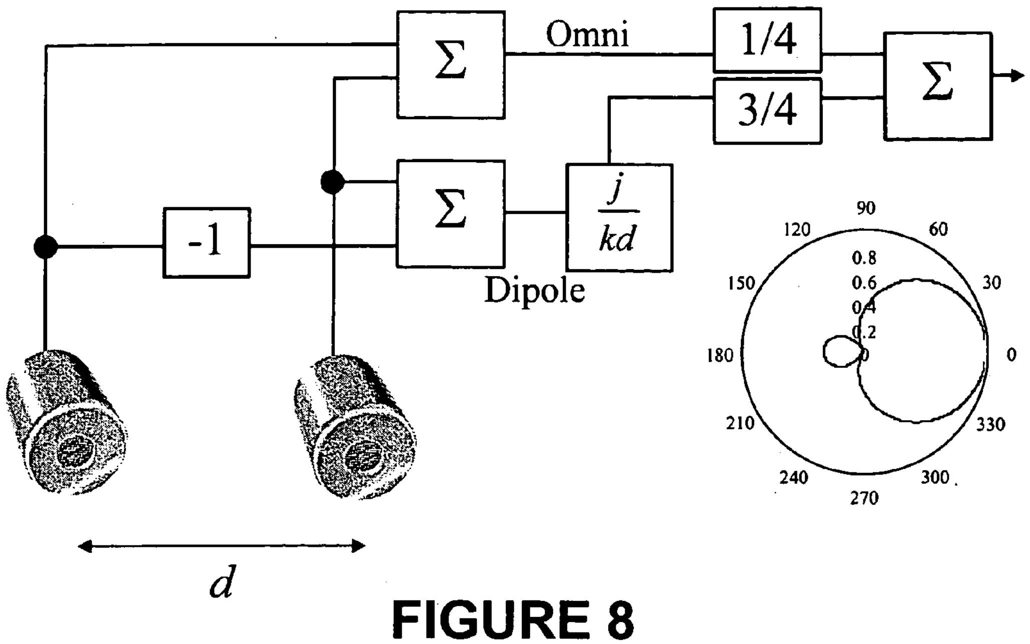
FIG. 8 is a block diagram of circuitry to form a quadrupole pattern.

As an example consider the block diagram of FIG. 8, which can form a quadrupole pattern. For the quadrupole, $$A=0,B=0,C=1$$

$$s_0=\frac{8}{(kd)^2},\quad s_1=-\frac{4}{(kd)^2},\quad s_{-1}=-\frac{4}{(kd)^2}.$$

The double integration filter at the output is necessary to provide a flat frequency response to the signal from the quadrupole. The implementation performs the signal addition before the filtering to accomplish the task with a single filter.

A more complete example is to form the optimum second order pattern. For this pattern $$A=-\frac{1}{6},\quad B=\frac{1}{3},\quad C=\frac{5}{6},\quad s_0=-\frac{1}{6}+\frac{20}{3(kd)^2},$$

$$s_1=-\frac{10}{3(kd)^2}-\frac{j}{3kd},\quad s_{-1}=-\frac{10}{3(kd)^2}+\frac{j}{3kd}.$$

Figure 9:
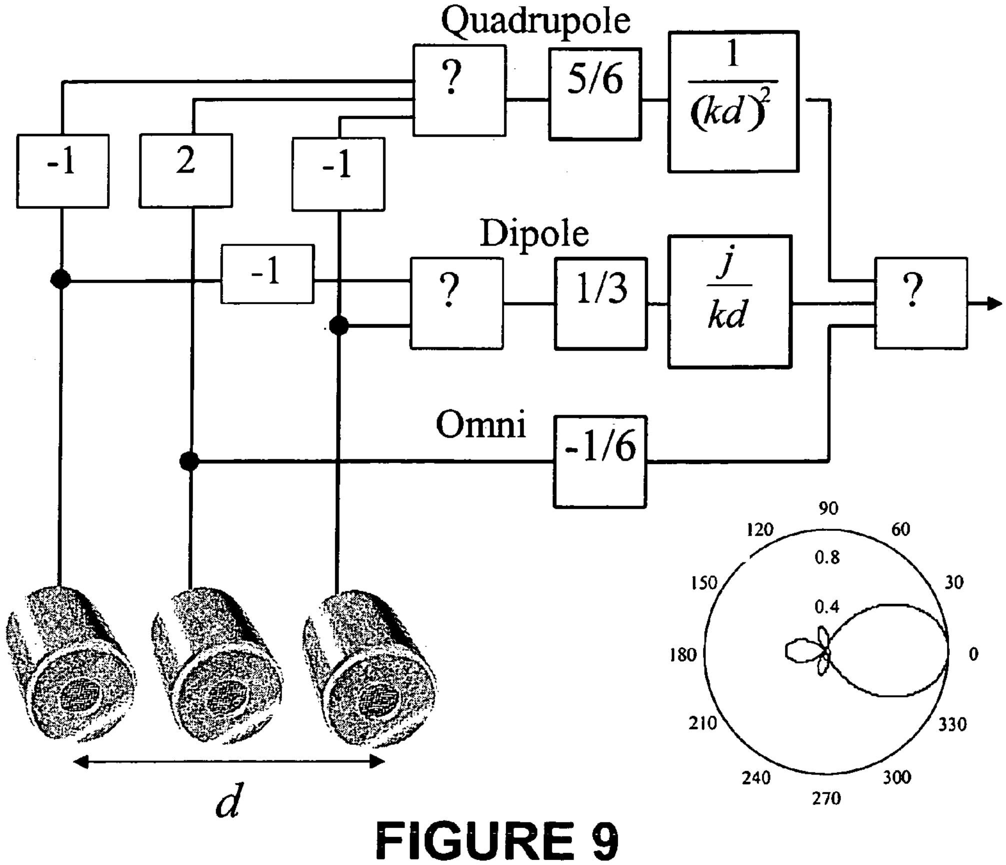
FIG. 9 is a block diagram of circuitry to form an optimum second order pattern.

A block diagram that implements this directional processing is illustrated in FIG. 9, which is a block diagram that shows the circuitry required to form the optimum second order pattern.

Microphone Sensitivity Errors in First Order Patterns

Comparing FIG. 7 for the first order pattern with FIG. 9 for the second order pattern, it appears that the complexity of the circuitry for the second order processing is not particularly greater. However, the apparent simplicity may be deceiving, because the tolerance on the values of the components, including the microphone sensitivity, is much greater.

The analysis above has assumed that the sensitivities of the two microphones are identical, and that the summing coefficients in the processing circuit are implemented with infinite precision. This is never the case in practice. There is always some variation in the sensitivities of microphones in production. Of course it is possible to manually measure and match the sensitivities in the production process, and to automatically compensate for sensitivity differences in real time in a hearing aid. Nonetheless there will always be some residual error. This section will examine the impact of the sensitivity error on the beam pattern shape and directivity index.

Since this problem is concerned only with sensitivity differences, one will assume that the sensitivity of the microphone $s_1$ is correct, and that the sensitivity of $s_{-1}$ is incorrect by the fraction δ. Then the pattern is calculated as $$R(\theta)=s_{-1}(1+\delta)e^{-j\frac{kd}{2}\cos\theta}+s_1e^{j\frac{kd}{2}\cos\theta}$$

$$\approx\left(\frac{A}{2}+\frac{jB}{kd}\right)(1+\delta)\left(1-j\frac{kd}{2}\cos\theta\right)+\left(\frac{A}{2}-\frac{jB}{kd}\right)\left(1_{-}j\frac{kd}{2}\cos\theta\right)$$

$$\approx(A+B\cos\theta)+\frac{\delta}{2}(A+B\cos\theta)+j\frac{\delta B}{kd}.$$

The first term above is the desired response. With the assumption that δ<<1, the second term is small. Also, the second term has the desired directionality, so it does not degrade the directivity of the pattern. The third term, however, does not have the desired directivity, and may not be small. Earlier it was assumed that kd<<1 at all frequencies of interest. However, at low frequencies, the effect is even more pronounced. Inevitably, there is a frequency below which the last error term above will dominate the response.

Microphone Sensitivity Errors in Second Order Patterns

The analysis has also assumed that the sensitivities of the three microphones are identical, and that the summing coefficients in the processing circuit are implemented with infinite precision. Again this is never the case in practice.

Since this problem is concerned only with sensitivity differences, one will assume that the sensitivity of the microphone $s_0$ is correct, and that the sensitivities of $s_{-1}$ and $s_1$ are incorrect by the fractions $\delta_1$ and $\delta_2$. Then the pattern is calculated as $$\begin{aligned}
R(\theta) &= s_{-1}e^{-j\frac{kd}{2}\cos\theta} + s_0 + s_1 e^{j\frac{kd}{2}\cos\theta} \\
&\approx (1+\delta_{-1})\left(-\frac{4}{(kd)^2}C + \frac{j}{kd}B\right)e^{-j\frac{kd}{2}\cos\theta} + \left(A + \frac{8}{(kd)^2}C\right) + \\
&\quad (1+\delta_1)\left(-\frac{4}{(kd)^2}C - \frac{j}{kd}B\right)e^{j\frac{kd}{2}\cos\theta} \\
&\approx (1+\delta_{-1})\left(-\frac{4}{(kd)^2}C + \frac{j}{kd}B\right)\left(1 - j\frac{kd}{2}\cos\theta - \frac{(kd)^2}{8}\cos^2\theta\right) + \\
&\quad \left(A + \frac{8}{(kd)^2}C\right) + \\
&\quad (1+\delta_1)\left(-\frac{4}{(kd)^2}C - \frac{j}{kd}B\right)\left(1 + j\frac{kd}{2}\cos\theta - \frac{(kd)^2}{8}\cos^2\theta\right) \\
&\approx (A + B\cos\theta + C\cos^2\theta) + \frac{1}{2}(\delta_1 + \delta_{-1})(B\cos\theta + C\cos^2\theta) + \\
&\quad j\frac{(\delta_{-1} - \delta_1)}{kd}B - \frac{4(\delta_{-1} + \delta_1)}{(kd)^2}C.
\end{aligned}$$

This first term above is the desired response. With the assumption that $\delta \ll 1$, the second term is small, so it does not degrade the directivity of the pattern. The remaining terms, however, do not have the desired directivity, and may not be small. The third term is first order in kd, and is the equivalent of the error in the first order pattern. The final error term is second order in kd, and has an even larger impact on the pattern at low frequencies. One started with the assumption that $kd \ll 1$ at all frequencies of interest. However, at low frequencies, the effect is even more pronounced. Inevitably, there is a frequency below which the last error term above will dominate the response, and this frequency is higher than the frequency that gives problems with the first order pattern.

Sensitivity and Noise for the Directional Patterns

Figure 10:
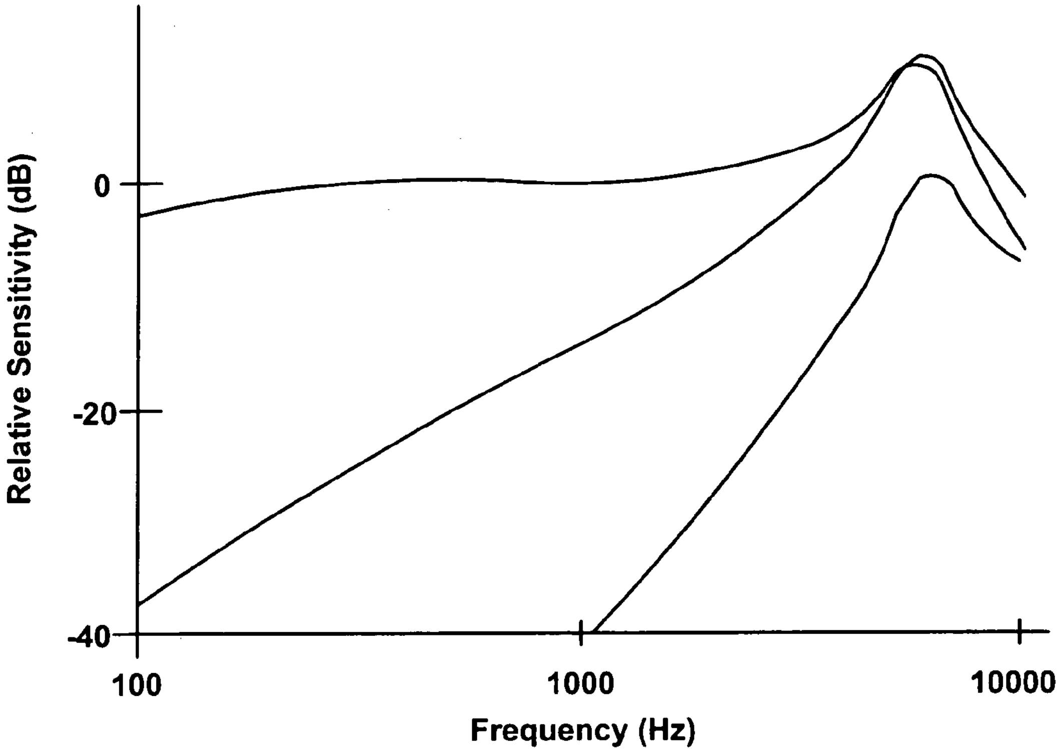
FIG. 10 is a graph illustrating sensitivity vs. frequency of an omni-directional microphone, a dipole and a quadrupole.

In forming the first and second order directional patterns, the signals from the microphones are subtracted, which significantly reduces the output voltage level of the beam. FIG. 10 shows the output sensitivity for the directional beams in comparison with the sensitivity of the omnidirectional microphones that were used to form them. For illustration, the primary microphones are shown with a frequency response similar to that of the Knowles Electronics LLC (Itasca, Ill., US) EM microphone series. However any other microphone family should show similar behavior. The sensitivity of a first order dipole pattern (middle curve) falls at 6 dB/octave with respect to the single microphone, leaving its output 20 dB below the single microphone at 500 Hz. Other first order patterns would have approximately the same sensitivity reduction. The second order quadrupole pattern (lower curve) falls at 12 dB/octave with respect to a single microphone and is 40 dB down at 1 kHz.

The internal noise of the beams is the sum of the noise power from the microphones used to form the beam. In the dipole pattern, the internal noise is 3 dB higher than the noise in a single microphone. In the quadrupole pattern, the internal noise is 4.8 dB higher than a single microphone. Taken by themselves, these noise increases are not a great disadvantage. However, in combination with the sensitivity reduction, they create the potential for a problem.

The reason is that in most applications, greater gain will be applied at low frequencies to compensate the falloff in signal sensitivity. This gain restores the signal sensitivity, but also amplifies the low frequency internal noise by the same factor. For the dipole pattern, this would increase the internal noise below 500 Hz by more than 20 dB, and for the quadrupole pattern it would increase the noise below 1 kHz by over 40 dB.

For first order patterns, this noise increase is acceptable only in noisy environments where the internal noise will be masked by the high level of environmental noise. In quiet environments, the hearing aid should be switched to a mode that uses a quieter omnidirectional microphone. For second order patterns, the equalization gain would add so much noise below 1 kHz, that it is probably unrealistic to use the pattern at lower frequencies.

Also for the second order patterns, there is another issue that limits their performance below 1 kHz. That issue is discussed below.

The example presented here relates to a three-microphone array whose total length is 10 mm. Arrays of other sizes can also be designed using the teachings of this invention. For longer arrays, it is possible to extend the use of the second order pattern to lower frequencies than the stated example. For shorter arrays, the crossover frequency between the first and second order processing needs to occur at a higher frequency. These effects are included in the design equations through the factor kd which includes the array length.

Frequency Limitations of Higher Order Directivity

The equations above indicate that at very low frequencies, the pattern shape will be severely degraded by the inevitable small inaccuracies in the microphone sensitivities. The important question is, at what frequency does this degradation become a problem.

Figure 11:
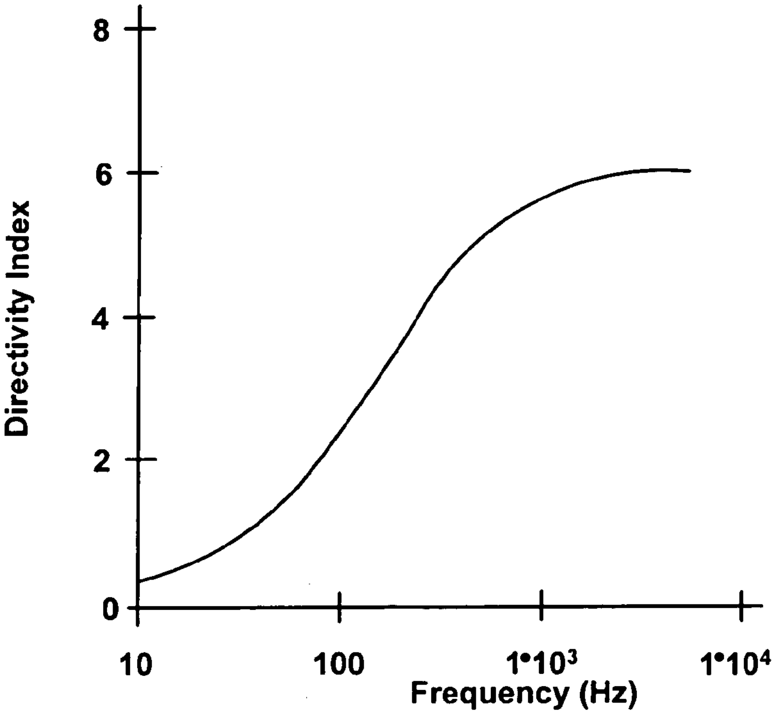
FIG. 11 is a graph illustrating the directivity index for a first order pattern subject to small errors in the microphones sensitivity.

A first example is illustrated in FIG. 11, which shows the directivity index for a first order pattern subject to small errors in the microphone sensitivity decreases at low frequencies. In the first example, the optimum first order pattern, the hypercardioid, formed from a pair of approximately matched microphones separated by 10 mm, is examined. In this example, one allows a sensitivity error δ of 0.05. This is approximately one half dB of amplitude mismatch or 3.5° of phase error. The hypercardioid pattern has an ideal directivity of 6 dB. When sensitivity errors are included, this ideal value is the limiting value of the directivity at high frequencies. The figure shows how the DI degrades at lower frequencies. For this example, the DI decreases to 5 dB at 500 Hz, and to 4 dB at 250 Hz. The graph is probably not accurate for smaller values of DI than this. The approximation used is only valid for smaller values of sensitivity error. It is desired to obtain a high DI over a wide range of relevant frequencies.

Figure 12:
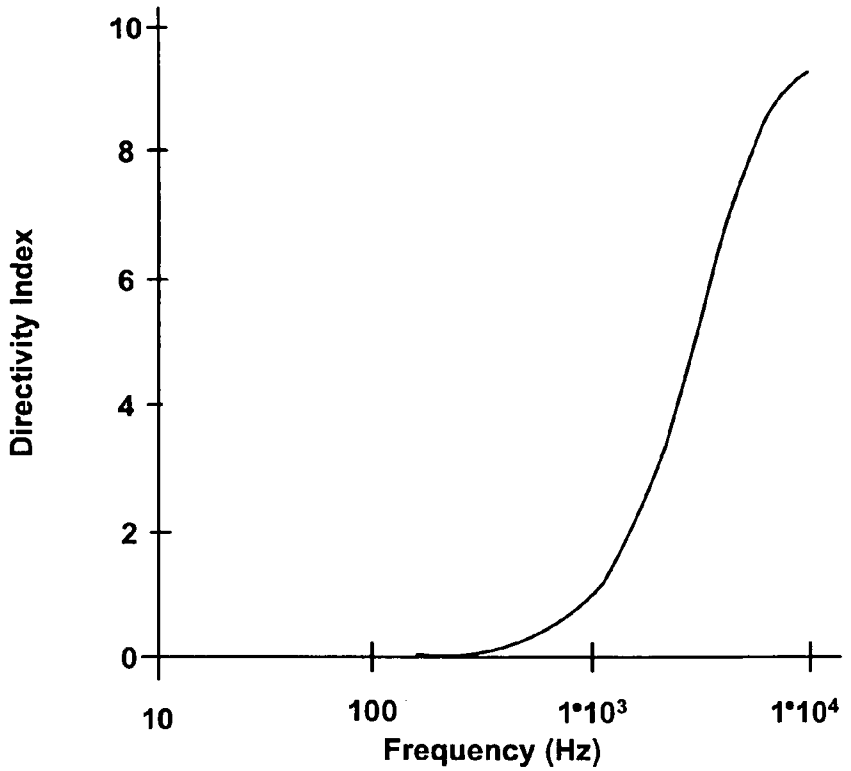
FIG. 12 is a graph illustrating the directivity index for a second order pattern subject to small errors in the microphones sensitivity.

A second example is illustrated in FIG. 12, which shows that the directivity index for a second order pattern subject to small sensitivity errors (5%) may be unacceptably small throughout the audio bandwidth. In the second example, the second order optimum pattern is considered. In order for the three microphones to fit within the space available in a hearing aid, the total aperture for the three microphones will be kept at 10 mm. If one allows the sensitivity errors to have the same magnitude as before, then the DI varies with frequency as shown in FIG. 12. At this level of sensitivity error, the second order pattern is of little value. The directivity index for the second order pattern does not exceed that for the first order pattern except for frequencies above 2800 Hz, and the DI does not approach its full value until the frequency is above 5 kHz.

Several things are necessary to make the second order pattern useable:

Use the second order pattern only for frequencies higher than 1 kHz. This makes phase matching of the microphone sensitivities much closer.

Use microphones with a flat response to at least 10 kHz.

Include an automatic, adaptive amplitude matching circuit.

The first two features provide a flat microphone frequency response throughout the bandwidth that the second order pattern is used. This means that the phase response is very near zero for both microphones, and eliminates any freedom for phase mismatch of the microphones. The third feature automatically compensates for any mismatch or drift in the magnitude of the sensitivity of the two microphones.

Figure 13:
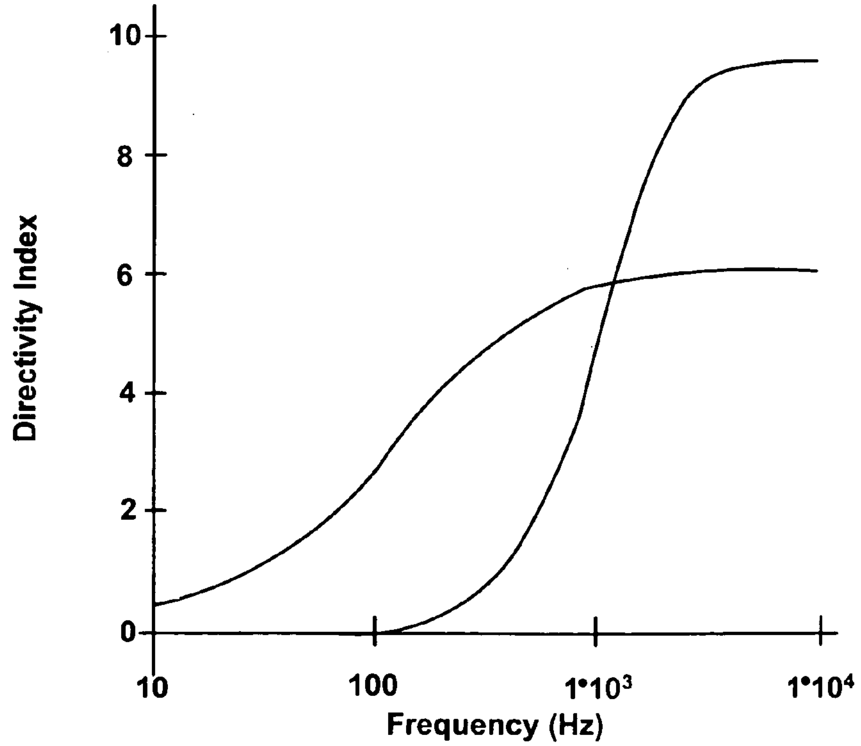
FIG. 13 is a graph illustrating a first order pattern and a second order pattern subject to small errors in the microphone sensitivity.

With these assumptions, the microphone mismatch, δ, may be reduced to 0.01. FIG. 13 illustrates that using a first order pattern at low frequencies and a second order pattern at high frequencies provides a hybrid directional pattern with improved DI. By itself, the second order pattern is not useable. Below 1 kHz, the pattern errors are becoming so great that one should not rely on the second order directivity. However, by using the first order pattern at lower frequencies and the second order pattern at higher frequencies, it is possible to gain an increased average DI. A hybrid system such as this can take advantage of the higher directivity of the second order pattern in the high frequency range, while providing acceptable directivity at lower frequencies. FIG. 13 shows the DI for the hypercardioid pattern as well as for the second order pattern. The hybrid system attempts to achieve a DI at each frequency that is the greater of the directivities of the two patterns.

Conceptual Implementation of a Hybrid Directional System

Figure 14:
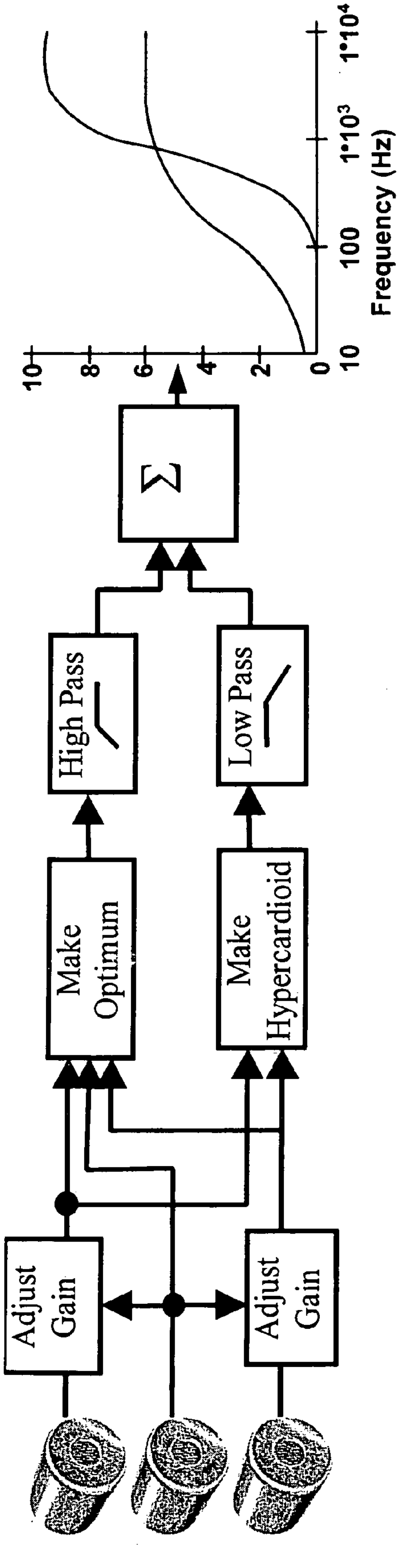
FIG. 14 is a block diagram of a hybrid order directional system.

FIG. 14 is a block diagram of a hybrid directional system. First the outer two microphones have their signal gain adjusted to match the amplitude of the center microphone. Then the microphone signals are combined to simultaneously form the optimum first and second order patterns. Finally, the patterns are filtered and combined in such a way that the output contains the high frequencies from the second order pattern and the low frequencies from the first order pattern.

There is one additional design feature that can improve the second order directivity. The gain adjustment circuitry on the outer two microphones can be designed in such a way that the residual matching error after adjustment has the opposite sign for the two microphones. In other words, $\delta_{-1}$, has the opposite sign from $\delta_1$. If this is done, then the largest component of the pattern error, which is $$\frac{4(\delta_{-1}+\delta_1)}{(kd)^2},$$

will tend to be smaller. If this allows the value of this term to be reduced by a factor of two, then the DI of the hybrid directional system may be significantly increased. This case is shown in the graph of FIG. 14.

Second Order Implementations Using First Order Directional Microphones

Figure 15:
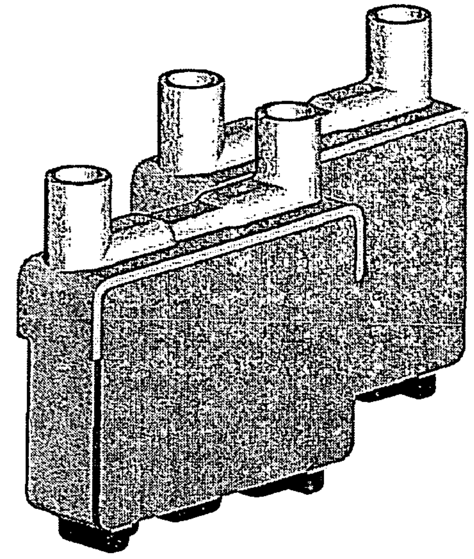
FIG. 15 is a perspective view of two first order microphones arranged to form a second order pattern.

As an alternative to using three pressure microphones to achieve second order directionality, it is also possible to use two first order directional microphones. FIG. 15 shows an arrangement of two such microphones, each with a port separation distance of d/2 located end-to-end so that the total separation of the end ports is d. The advantage of this implementation is that there is no sensitivity error in the pattern of the separate directional microphones because the difference is an acoustic difference across a single diaphragm. Thus the pattern has only a first order sensitivity error.

If one starts with the assumption that each of the microphones has a dipole pattern, then the response of the microphones together is:

$$\begin{aligned} R(\theta) &= j\frac{kdB_1}{2}\cos\theta e^{-j\frac{kd}{2}\cos\theta} + j\frac{kdB_2}{2}\cos\theta e^{j\frac{kd}{2}\cos\theta} \\ &\approx j\frac{kdB_1}{2}\cos\theta\left(1 - j\frac{kd}{2}\cos\theta\right) + j\frac{kdB_2}{2}\cos\theta\left(1 + j\frac{kd}{2}\cos\theta\right) \\ &\approx j\frac{kd}{2}(B_1+B_2)\cos\theta + \frac{(kd)^2}{4}(B_1-B_2)\cos^2\theta. \end{aligned}$$

Here the factor jkd/2 is included in the sensitivity of each first order microphone to explicitly show the frequency response of the final pattern. If the two dipole microphones have equal axial sensitivity but are oriented in opposite directions, then:

$B_2=-B_1=B$, and $$R(\theta) \approx \frac{(kd)^2B}{2}\cos^2\theta S$$

or $$R(\theta) \approx \frac{(kd)^2B}{2}\cos^2\theta + j\frac{\delta kdB}{2}\cos\theta$$

if the sensitivity error is included. This implementation has two advantages over the previous version in its errors. First, the error term has only one less factor of kd than the pattern. Second, the error term has a dipole shape, so it is less disruptive in directions to the sides. Note that there has been no accounting for any deviation from ideal in the pattern shape of the two dipoles. That could potentially add enough additional error to counteract the apparent advantage of this implementation.

Another possibility for the directional microphones would be to use a first order difference microphone whose internal delay parameters had been adjusted to give a cardioid pattern shape. Then one has:

$$\begin{aligned} R(\theta) &= j\frac{kdB_1}{2}(1+\cos\theta)e^{-j\frac{kd}{2}\cos\theta} + j\frac{kdB_2}{2}(1+\cos\theta)e^{j\frac{kd}{2}\cos\theta} \\ &\approx j\frac{kdB_1}{2}(1+\cos\theta)\left(1 - j\frac{kd}{2}\cos\theta\right) + j\frac{kdB_2}{2}(1+\cos\theta)\left(1 + j\frac{kd}{2}\cos\theta\right) \\ &\approx j\frac{kd}{2}(B_1+B_2)(1+\cos\theta) + \frac{(kd)^2}{4}(B_1-B_2)(\cos\theta+\cos^2\theta). \end{aligned}$$

If one again allows $B_2=-B_1=B$, then $$R(\theta) \approx \frac{(kd)^2B}{2}(\cos\theta+\cos^2\theta) + j\frac{\delta kdB}{2}(1+\cos\theta).$$

This is the second order pattern plotted earlier which has a null in the rear direction and an ideal DI of 8.8 dB.

The pattern formed from two directional microphones that has the greatest possible directivity has the angular response $$R(\theta) \approx \frac{(kd)^2}{2}\left(\frac{3}{8}\cos\theta + \frac{5}{8}\cos^2\theta\right).$$

This pattern has an ideal DI of 9.0 dB. It is formed from two first order patterns whose angular response is:

$$R(\theta) \approx \frac{kd}{2}\left(\frac{3}{8} + \frac{5}{8}\cos\theta\right).$$

The second order pattern with optimum directivity can also be formed from two directional microphones with the further addition of an omnidirectional microphone.

Figure 16:
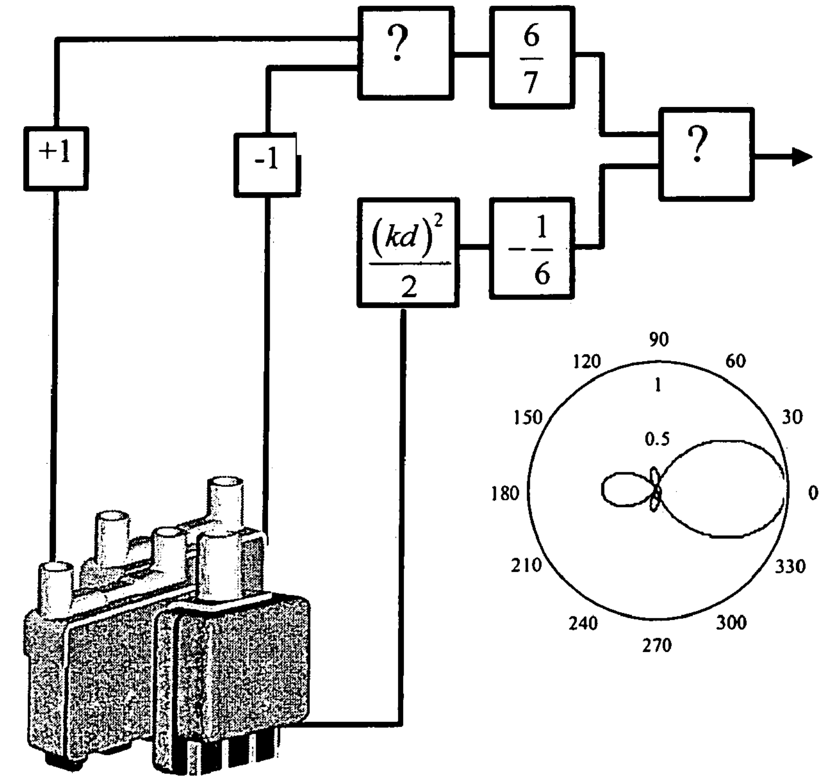
FIG. 16 is a block diagram of an implementation of an optimum second order pattern.

A final example, shown in FIG. 16, is a block diagram of an implementation of an optimum second order pattern. One considers forming the optimum second order pattern. Earlier this was shown to have the pattern function $$R(\theta) = \frac{1}{6} + \frac{1}{3}\cos\theta + \frac{5}{6}\cos^2\theta.$$

In this case, one uses the fact that there will be an omnidirectional microphone in addition to the two first order directional microphones for lowest noise performance in quiet environments. This microphone placed at the acoustic center can most directly provide the leading term in the pattern function. The two directional terms can then come from two identical first order microphones. If each of the directional microphones has the pattern $$R(\theta) = \frac{jkd}{2}\left(\frac{2}{7} + \frac{5}{7}\cos\theta\right),$$

and the output signals of the two microphones are subtracted, then the pattern of these two alone is $$R(\theta) = \frac{(kd)^2}{2}\left(\frac{2}{7}\cos\theta + \frac{5}{7}\cos^2\theta\right).$$

This is added to the pressure microphone to form the final pattern.

Figure 17:
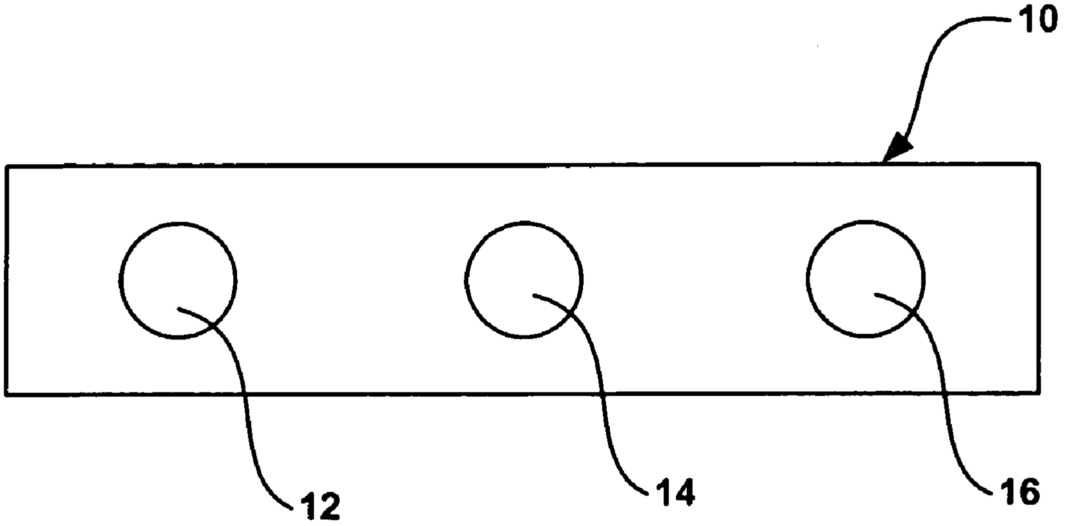
FIG. 17 is a block diagram of a microphone array providing a second order directional pattern in accordance with the invention.
Figure 18:
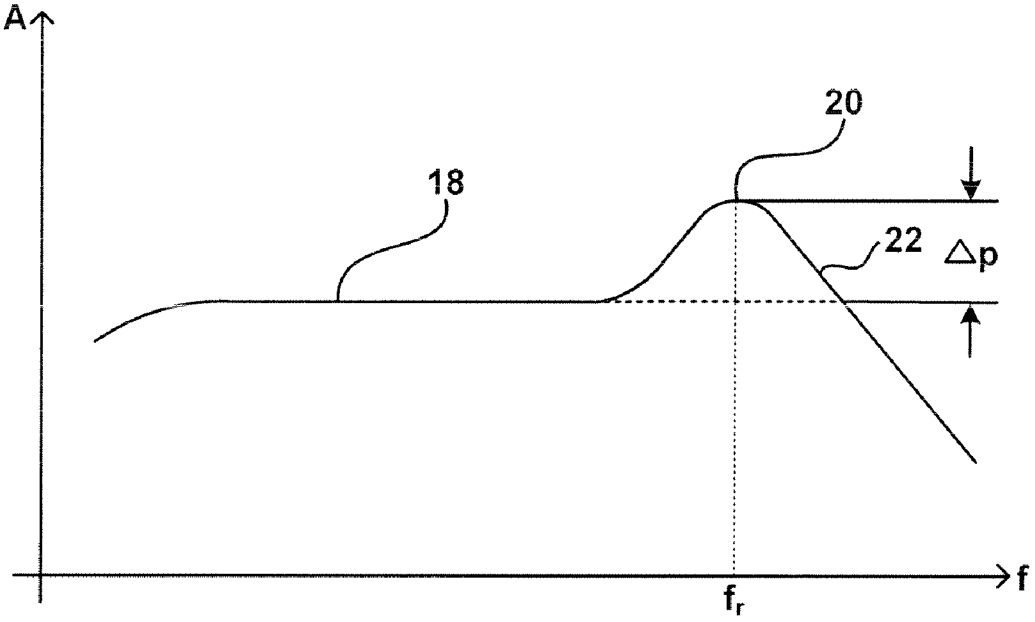
FIGURE 18 PRIOR ART
FIG. 18 is a frequency response curve for a typical microphone.

A directional microphone array 10 having first, second and third omni-directional microphones 12, 14, and 16, is illustrated in FIG. 17. A typical frequency response curve of a microphone is illustrated in FIG. 18. Typically, the frequency response has a generally linear portion 18, rising to a peak 20 at a resonant frequency $f_r$ followed by a declining portion 22. As discussed above, it is preferable that all microphones in an array have identical response characteristics across the entire range of relevant frequencies. But typically this is not commercially feasible in practice. Accordingly, it has been found that an important characteristic to focus on is damping, and matching microphones having similar damping characteristics.

One way of matching microphones having similar damping characteristic is by measuring (1) its Δp (which is the difference in the magnitude of the linear portion 18, and the magnitude at the resonant frequency $f_r$) and (2) the resonant frequency $f_r$ of each of the microphones. A tolerance for determining if two microphones are sufficiently matched is determined based upon the ultimate acceptable directivity index desired. As long as the differences in the respective Δp's and resonant frequencies $f_r$ of three microphones are within the predetermined tolerance, then the three microphones 12, 14, 16 should be considered acceptable for a particular array.

Other criteria can also be used to determine if microphones have sufficiently matched damping characteristics.

For example, one could use a measure of the frequency difference between points that are 3 dB down from the resonant frequency $f_r$ which is referred to as Δf. Alternatively, one might use Δf divided by the resonant frequency $f_r$, which is also called the Q of the resonance. Each of these provides similar information in different terms.

The Q of the resonance is approximately related to Δp, wherein Δp is approximately equal to 20 log Q, so matching Δp among microphones is equivalent to matching Q.

Once one determines that three particular microphones are acceptable for a particular array, then one still has the choice of which order to place the microphones in the array. Looking at the equation for microphone sensitivity errors in second order patterns discussed above, one sees that the last term is the largest error term, as the product kd in the denominator is small, and increases with the square of frequency. One may arrange the microphones 12, 14, and 16 in the array to minimize the magnitude of the largest error term over the operational frequency band of the array. The fraction $\delta_1$ is the error of one of the outer microphones and the fraction $\delta_{-1}$ is the error of the other of the outer microphones. If the fractions $\delta_1$ and $\delta_{-1}$ are opposite in sign, they will partially cancel each other. While in a practical sense it is not possible to make the fractions exactly equal and opposite, by at least making them opposite, one reduces the magnitude of the overall error term. It is possible that the fractions $\delta_1$ and $\delta_{-1}$ may not be opposite at all frequencies, that is, the response magnitude curves may cross. Since the error term increases rapidly with frequency, it is most important that the fractions cancel each other at the highest frequencies in which the array is expected to function. It is typical of closely matched microphones to have response magnitudes that cross at most once in the region of the resonance peak, crossing close to the resonance frequency and otherwise remaining approximately parallel. This implies that in cases where the resonant frequency is well below or well above the highest operational frequency of the array, a simple method may be employed to find the optimum microphone order.

Figure 19:
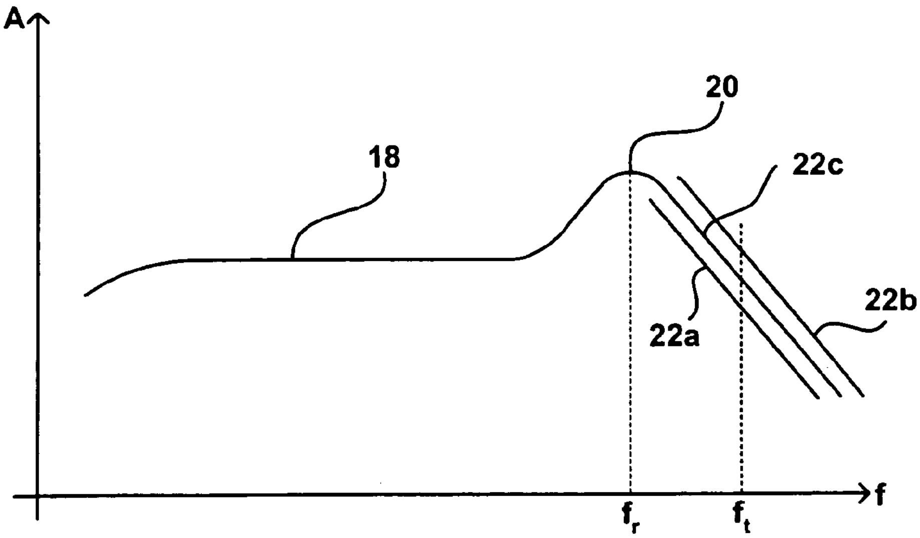
FIG. 19 is a frequency response curve of three microphones having different high frequency response characteristics.

For the case where the resonant frequencies of the microphones are well below the highest operational frequency of the array, this is accomplished by looking at the declining portion of the response curves of the three microphones for the array 10. Referring to FIG. 19, typically the declining portions 22*a*, 22*b*, and 22*c* of the three microphones are substantially parallel. Thus one looks at the relative magnitudes of each of the curves at a test frequency $f_t$, which frequency is above the resonant frequencies of each of the microphones. The microphone having the middle response magnitude is selected as the middle microphone 14, while the other two are the outer microphones 12 and 16.

Additionally, it is found that matched for Q and Δp as described have response curves that are either approximately parallel in the region of their resonance peaks, or cross in the region immediately in the region near the maximum of the peaks.

Figure 20:
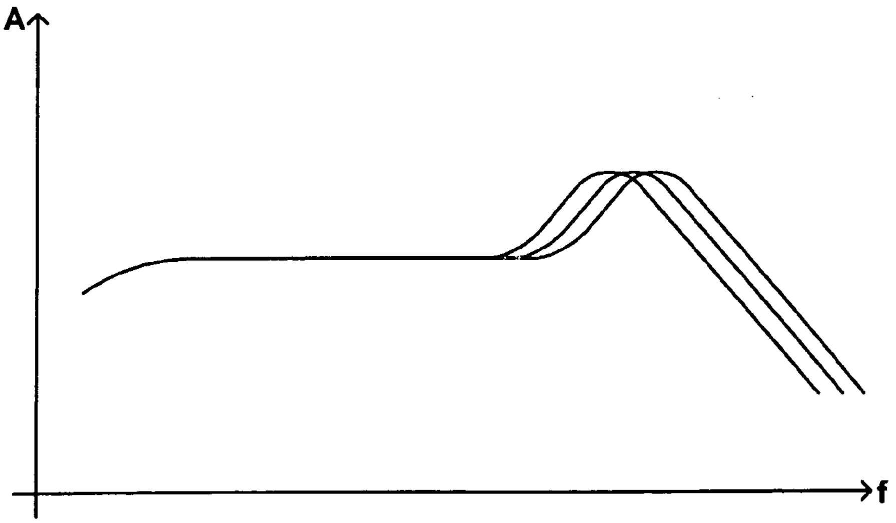
FIG. 20 is a frequency response curve of three microphones having different mid frequency response characteristics.

Therefore, as illustrated in FIG. 20, the microphone with the middle response on the declining part of the response curve will also have the middle response on the rising part of the curve. Therefore, a frequency, on the rising part of the response may be used as an equivalent criteria for choosing the middle microphone.

While the specific embodiments have been illustrated and described, numerous modifications come to mind without significantly departing from the spirit of the invention and the scope of protection is only limited by the scope of the accompanying Claims.

I claim:

1. A directional microphone array comprising:

first, second and third omni-directional microphones, each of the microphones for converting an audible signal to a corresponding electrical signal;

each of the microphones having a resonant frequency and a response magnitude;

one of the microphones is disposed between the other two of the microphones in the array, the middle microphone having a middle response magnitude between the response magnitude of the other two microphones; and each of the microphones being characterized by a corresponding response curve, each of the response curves having a portion, each of the portions being substantially parallel to each other, and the middle response magnitude of the middle microphone is selected from within the portion.

2. The directional microphone array of claim 1, wherein the portion of the response curve comprises a portion of the response curve prior to the resonant frequencies.

3. The directional microphone array of claim 1, wherein the portion of the response curve comprises a portion of the response curve subsequent to the resonant frequencies.

4. The directional microphone array of claim 1, wherein the portion of the response curve comprises a portion of the response curve subsequent a linear region of response and prior to the resonant frequencies.

5. A directional microphone system comprising:

first, second and third microphones, each of the first, second and third microphones having an electrical output signal representative of a received audio signal, each of the first, second and third microphones having a resonant frequency and a response magnitude, and the microphones being arranged in an array;

a signal processor coupled to receive the output signal of each of the first, second and third microphones, the signal processor providing a directional output signal based upon the received output signals of each of the first, second and third microphones;

one of the first, second and third omni-directional microphones is disposed between the other two of the microphones in the array, the middle microphone having a middle response magnitude between the response magnitude of the other two microphones; and each of the microphones being characterized by a corresponding response curve, each of the response curves having a portion, each of the portions being substantially parallel to each other, and the middle response magnitude of the middle microphone is selected from within the portion.

6. The directional microphone system of claim 5, wherein the portion of the response curve comprises a portion of the response curve prior to the resonant frequencies.

7. The directional microphone system of claim 5, wherein the portion of the response curve comprises a portion of the response curve subsequent to the resonant frequencies.

8. The directional microphone system of claim 5, wherein the portion of the response curve comprises a portion of the response curve subsequent a linear region of response and prior to the resonant frequencies.

* * * * *

UNITED STATES PATENT AND TRADEMARK OFFICE

CERTIFICATE OF CORRECTION

PATENT NO. : 7,471,798 B2
APPLICATION NO. : 10/424552
DATED : December 30, 2008
INVENTOR(S) : Daniel M. Warren It is certified that error appears in the above-identified patent and that said Letters Patent is hereby corrected as shown below:

<u>On the Cover Page:</u>

At item (63), add -- Continuation-in-part of application No. 09/966,873, filed September 28, 2001. --.

At item (60), add -- Provisional application No. 60/236,768, filed September 29, 2000 and provisional application No. 60/322,211, filed September 11, 2001. --.

Signed and Sealed this
Twenty-eighth Day of December, 2010

David J. Kappos
*Director of the United States Patent and Trademark Office*